US010572820B2

(12) United States Patent
Jagota et al.

(10) Patent No.: US 10,572,820 B2
(45) Date of Patent: Feb. 25, 2020

(54) EVALUATING PERSONALIZED RECOMMENDATION MODELS

(71) Applicant: salesforce.com, inc., San Francisco, CA (US)

(72) Inventors: Arun Kumar Jagota, Sunnyvale, CA (US); Stanislav Georgiev, Sunnyvale, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 1106 days.

(21) Appl. No.: 14/843,078

(22) Filed: Sep. 2, 2015

(65) Prior Publication Data
US 2017/0061325 A1 Mar. 2, 2017

(51) Int. Cl.
G06N 20/00 (2019.01)
G06F 16/9535 (2019.01)
G06F 16/335 (2019.01)

(52) U.S. Cl.
CPC ........... G06N 20/00 (2019.01); G06F 16/337 (2019.01); G06F 16/9535 (2019.01)

(58) Field of Classification Search
CPC ............ G06N 99/005; G06F 17/30702; G06F 17/30867
See application file for complete search history.

(56) References Cited

U.S. PATENT DOCUMENTS

| 5,577,188 | A |   | 11/1996 | Zhu |
|---|---|---|---|---|
| 5,583,763 | A | * | 12/1996 | Atcheson ............... G06Q 30/02 707/750 |
| 5,608,872 | A |   | 3/1997 | Schwartz |
| 5,649,104 | A |   | 7/1997 | Carleton |
| 5,715,450 | A |   | 2/1998 | Ambrose et al. |
| 5,761,419 | A |   | 6/1998 | Schwartz |
| 5,819,038 | A |   | 10/1998 | Carleton |
| 5,821,937 | A |   | 10/1998 | Tonelli et al. |
| 5,831,610 | A |   | 11/1998 | Tonelli et al. |

(Continued)

OTHER PUBLICATIONS

Batista, Gustavo EAPA, Ronaldo C. Prati, and Maria Carolina Monard. "A study of the behavior of several methods for balancing machine learning training data." ACM SIGKDD explorations newsletter 6, No. 1 (2004): 20-29. 2004.*

(Continued)

*Primary Examiner* — Daniel T Pellett
(74) *Attorney, Agent, or Firm* — Dergosits & Noah LLP; Todd A. Noah

(57) ABSTRACT

A personalized recommendation model scores each object in an interaction set of objects with which a user interacted and in a ransom set of objects with which the user lacks known interaction. A system sorts each scored object based on a decreasing order of each corresponding score, and identifies a high scoring set of the sorted objects with a number (equal to the number of objects in the interaction set of objects) of highest corresponding scores. The system aggregates a corresponding order value for each object in the high scoring set that is also in the interaction set of objects (the corresponding order value for an object is based on a corresponding order for the object in the high scoring set). The system evaluates the model for the user by dividing the aggregated order value by an aggregation of a corresponding order value for each object in the high scoring set.

20 Claims, 4 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,274 B2 | 10/2013 | Koister |
| 8,566,301 B2 | 10/2013 | Rueben et al. |
| 8,646,103 B2 | 2/2014 | Jakobson et al. |
| 8,924,419 B2 | 12/2014 | Koister et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0089951 A1 | 8/2007 | Koister et al. |
| 2009/0063415 A1 | 3/2009 | Chatfield et al. |
| 2009/0100342 A1 | 4/2009 | Rueben et al. |
| 2009/0177744 A1 | 7/2009 | Marlow et al. |
| 2011/0246465 A1 | 10/2011 | Koister et al. |
| 2012/0233137 A1 | 9/2012 | Jakobson et al. |
| 2013/0085745 A1 | 4/2013 | Koister et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |

OTHER PUBLICATIONS

Burke, Robin. "Hybrid recommender systems: Survey and experiments." User modeling and user-adapted interaction12.4 (2002): 331-370. (Year: 2002).*

U.S. Appl. No. 13/986,251, filed Apr. 16, 2013.

* cited by examiner

FIG. 2A

| Account | City | Industry | Size | Interactions |
|---|---|---|---|---|
| A | San Francisco | Information Technology | Very Small | 4 |
| B | San Jose | Information Technology | Small | 5 |
| C | San Francisco | Information Technology | Very Small | 4 |
| D | San Jose | Information Technology | Very Small | 6 |
| E | San Jose | Information Technology | Small | 4 |
| F | San Francisco | Information Technology | Small | 4 |
| ... | ... | ... | ... | ... |
| X | San Diego | Marketing | Small | 0 |
| Y | Los Angeles | Information Technology | Large | 0 |
| Z | San Francisco | Banking | Very Small | 0 |

FIG. 2B

| Account | Score | Order Value |
|---|---|---|
| B | 68 | 3 |
| Z | 67 | 2 |
| D | 66 | 1 |
| F | 65 | 0 |
| Y | 33 | 0 |
| X | 0 | 0 |

FIG. 2C

| Account | Score | Order Value |
|---|---|---|
| B | 84 | 3 |
| D | 83 | 2 |
| Z | 67 | 1 |
| F | 66 | 0 |
| Y | 33 | 0 |
| X | 16 | 0 |

FIG. 2D

| Account | Score | Order Value | Interactions | Weighted Order Value |
|---|---|---|---|---|
| B | 84 | 3 | 5 | 15 |
| D | 83 | 2 | 6 | 12 |
| Z | 67 | 1 | 0 | 0 |
| F | 66 | 0 | 4 | 0 |
| Y | 33 | 0 | 0 | 0 |
| X | 16 | 0 | 0 | 0 |

FIG. 2E

| Account | Score | Order Value | Interactions | Weighted Order Value |
|---|---|---|---|---|
| D | 84 | 3 | 6 | 18 |
| B | 83 | 2 | 5 | 10 |
| Z | 67 | 1 | 0 | 0 |
| F | 66 | 0 | 4 | 0 |
| Y | 33 | 0 | 0 | 0 |
| X | 16 | 0 | 0 | 0 |

EVALUATING PERSONALIZED RECOMMENDATION MODELS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A set of users U interacted with some of the objects o in a universe of objects O in a particular pre-defined way, with varying degrees of success. (u, o), u∈U, o∈O, denotes an interacting (user, object) pair, and an interaction strength $w_{uo}$ is associated with such a pair. A personalized recommendation model recommends, for any user u, objects in O that are similar to the objects o with which the user u has previously interacted. The higher the interaction strength, the more positive the influence the properties of o should have for recommending new objects to the user u. A personalized recommendation system may build a personalized recommendation model $M_u$, one for each user u, from the historical interaction data of the user u. This historical interaction data of the user u is $D_u = \{(o, w_{uo})|w_{uo}>0\}$, where $w_{uo}>0$ is an indicator that user u has interacted with object o. $M_u$ uses the content of object o and the interaction strength of $w_{uo}$ of (u, o) to make recommendations. The personalized recommendation model $M_u$ uses a score function $M_u$score(o) to assign a score to any object o∈O, reflecting on how similar object o is to user u's data $D_U$ on which the model $M_u$ was trained. This score function is used for recommending new objects to user u.

A personalized recommendation system has challenges in evaluating when the personalized recommendation models $\{M_u\}$ are "good enough" to be used in production and also in evaluating potential improvements to the personalized recommendation models $\{M_u\}$. Such evaluations seem to require human identification of objects that form good recommendations for a sufficiently large set of users, and require human identification of objects that form bad recommendations for a sufficiently large set of users. Such human identification, which might be very useful, tends to be very laborious and error-prone. Accordingly, it is desirable to provide techniques for evaluating personalized recommendation models that do not require such human identification.

BRIEF DESCRIPTION OF THE DRAWINGS

In the following drawings like reference numbers are used to refer to like elements. Although the following figures depict various examples, the one or more implementations are not limited to the examples depicted in the figures.

FIGS. 2A-2E illustrate example objects used for evaluating personalized recommendation models, in an embodiment;

DETAILED DESCRIPTION

General Overview

Figure 1:
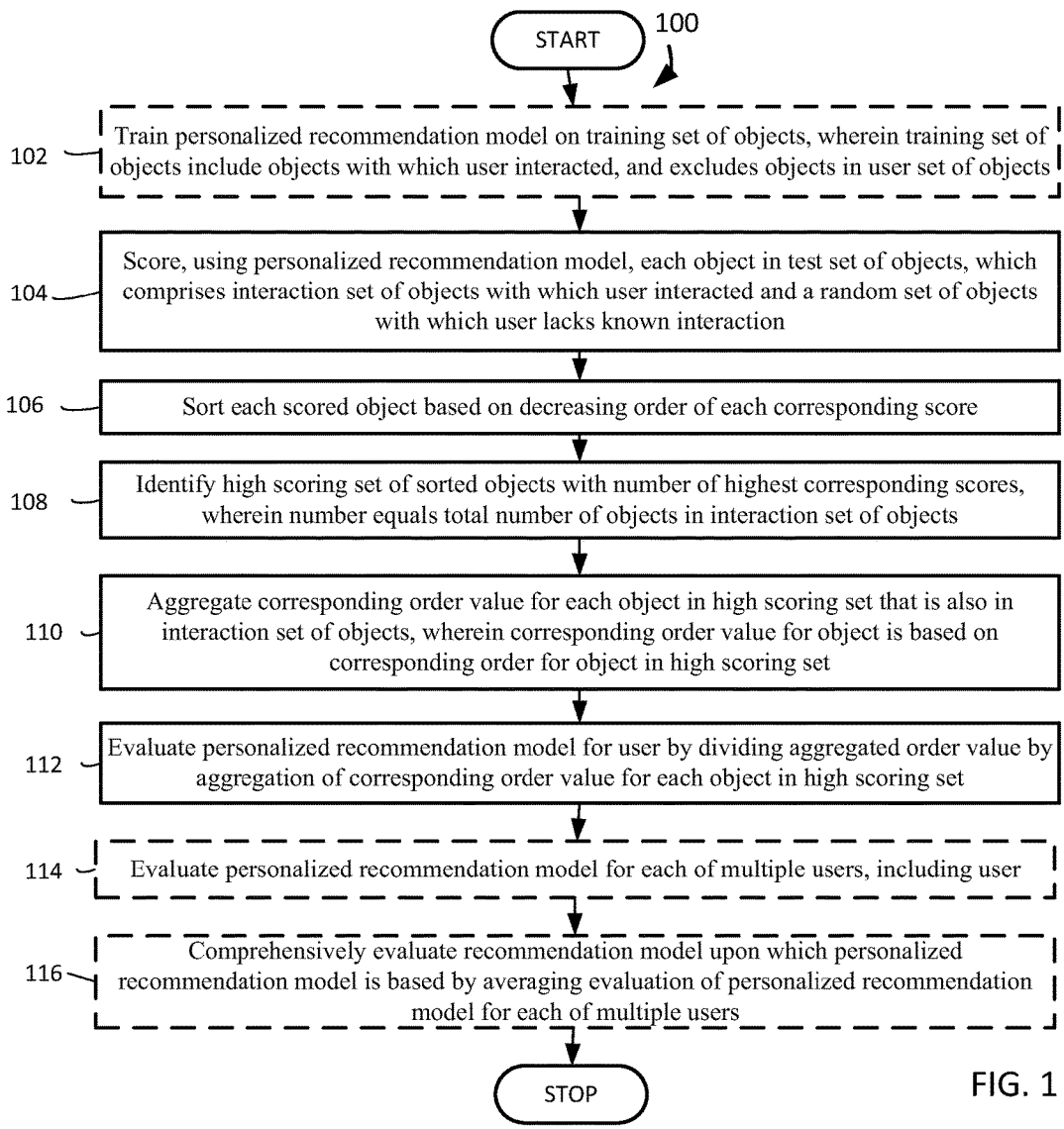
FIG. 1 is an operational flow diagram illustrating a high level overview of a method for evaluating personalized recommendation models, in an embodiment.

Systems and methods are provided for evaluating personalized recommendation models. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, mechanisms and methods for evaluating personalized recommendation models will be described with reference to example embodiments. The following detailed description will first describe a method for evaluating personalized recommendation models. Next, example objects for evaluating personalized recommendation models are described.

In accordance with embodiments described herein, there are provided systems and methods for evaluating personalized recommendation models. A system uses a personalized recommendation model to score each object in test set of objects, which includes an interaction set of objects with which a user interacted and in a random set of objects with which the user lacks a known interaction. The system sorts each scored object based on a decreasing order of each corresponding score, and identifies a high scoring set of the sorted objects with a specified number (equal to the total number of objects in the interaction set of objects) of the highest corresponding scores. The system aggregates a corresponding order value for each object in the high scoring set that is also in the interaction set of objects. The corresponding order value for an object is based on a corresponding order for the object in the high scoring set. The system evaluates the personalized recommendation model for the user by dividing the aggregated order value by an aggregation of a corresponding order value for each object in the high scoring set.

In a simplified example, after training a personalized recommendation model on half of a sales representative's six accounts, the system uses the model to score a test set of accounts that includes the sales representative's three remaining accounts and a random sampling of three accounts from the universe of accounts which the model may score. The system sorts the six scored accounts in descending order based on their scores, and identifies the three accounts with the top three scores, which could be the sales representative's three remaining accounts if the model made perfect recommendations. In this example, the highest scoring account has an order value of 3, the second highest scoring account has an order value of 2, and the third highest scoring account has an order value of 1. The system aggregates the relevance-adjusted order values for each account in the top three scoring accounts that are also the sales representative's accounts, all of which are expected to be in the top three scoring accounts. Therefore, the system aggregates the order value of 3 with the order value of 2 to result in an actual aggregated order value of 5 because the top two scoring accounts are the sales representative's accounts, but does not aggregate the order value of 1 because the third highest scoring account was randomly selected from the universe of all accounts and is not one of the sales representative's accounts. The system aggregates the order value of 3 with the order value of 2 and the order value of 1 to result in a potential maximum aggregated order value of 6. The system divides the actual aggregated order value of 5 by the potential maximum aggregated order value of 6 to result in an evaluation of the model as the fraction ⅚, or 0.83 in decimal form. For this example, the highest evaluation would have produced the fraction 6/6, or 1.0 in decimal form. The system may repeat the process to evaluate all personalized recommendation models for all sales representatives, and then average all of the evaluations to produce a comprehensive evaluation of the recommendation model upon which all of the personalized recommendation models are based.

While one or more implementations and techniques are described with reference to an embodiment in which evaluating personalized recommendation models is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 1 is an operational flow diagram illustrating a high level overview of a method 100 for evaluating personalized recommendation models. The examples of objects which are described below in reference to FIG. 1 are depicted in FIGS. 2A-2E and described below in reference to FIGS. 2A-2E.

The system optionally trains a personalized recommendation model on a training set of objects which include only some of the objects with which a user interacted, block 102. For example and without limitation, this can include the system training a personalized recommendation model on a randomly selected half of a sales representative's six accounts, which are account A, account C, and account E depicted in bold in FIG. 2A. Even though the example describes the system using half of the objects with which a user interacted to train a personalized recommendation model, the system may use any representative portion of the objects with which a user interacted to train the model. Once the evaluation phase is over, the model may be trained on all of the objects with which the user has interacted. Although FIG. 2A depicts only the four properties of city, industry, business size, and interaction strength for each account object, the system may apply the method 100 to any number and any type of any properties for any object type, such as contact information properties for business contact objects. By training a personalized recommendation model on properties of objects with which a user has interacted and experienced some degree of success, the system enables the model to recommend other objects with similar properties, with the expectation of similar success. While FIG. 2A depicts interaction values as the integers 4, 5, and 6, the interaction values may be any type of values and may represent any type of interaction strength, such as the number of opportunities closed and won, opportunity sizes, recency of opportunities, and recency of contacts purchased.

Although the sales representative's six accounts {A, B, C, D, E, F} are equally distributed between San Francisco {A, C, F} and San Jose {B, D, E}, and equally distributed among very small businesses {A, C, D} and small businesses {B, E, F}, the random sampling resulted in the training set {A, C, E,} which is weighted more to San Francisco and very small businesses. All of the accounts {A, B, C, D, E, F} are Northern California-based information technology businesses that are either very small or small.

Having optionally trained a personalized recommendation model on some of the objects with which a user interacted, the personalized recommendation model scores each object in the test set of objects, which includes an interaction set of objects, which is the remaining objects with which a user interacted, and a random set of objects with which the user lacks known interaction, block 104. By way of example and without limitation, this can include the system using the model to score a test set of accounts that includes the sales representative's three remaining accounts {B, D, F}, which may be referred to as positive objects, and a random sampling of three accounts {X. Y, Z} from the universe of accounts which the model may score, which may be referred to as negative objects. Although this example describes the system using exactly half of the objects which with a user interacted for testing a personalized recommendation model, the system may use any representative sampling of the objects which with a user interacted for testing the model. Similarly, although this example describes using a number of randomly sampled objects from the universe of objects that equals the number which is exactly half of the objects which with a user interacted, the system may use any representative random sampling of objects from the universe of objects. Since the random sampling is from the universe of accounts which the model may score, a small possibility exists that the user interacted with some of these randomly sampled accounts, but no known user interaction is used in the random sampling process. The accounts {X. Y, Z} are depicted in gray in FIG. 2A, including account Z, which is a San Francisco based banking business that is very small, but is in the banking industry instead of the information technology industry.

After the model scores the objects in a test set of objects, the system sorts each scored object based on a decreasing order of each corresponding score, block 106. In embodiments, this can include the system sorting the six scored accounts {B, D, F, X, Y, Z} in descending order based on their scores, which results in the order {B, Z, D, F, Y, X} depicted in FIG. 2B.

After sorting the scored objects, the system identifies a high scoring set of sorted objects with a number of highest corresponding scores, wherein the number equals the total number of objects in the interaction set of objects, block 108. For example and without limitation, this can include the system identifying the three accounts {B, Z, D} with the top scores {68. 67. 66}, which would be the sales representative's three remaining accounts if the model made perfect recommendations. FIG. 2B depicts the top three scoring accounts {B, Z, D} in bold, because these scored accounts will be used for further processing, and depicts the bottom three scoring accounts in gray because these scored accounts will no longer be referenced. At this point in the method 100, the system uses a version of a normalized discounted cumulative gain metric to evaluate the model based on the relevance and score of the objects in the high scoring set of objects.

After identifying the highest scoring objects, the system aggregates a corresponding relevance-adjusted order value for each object in a high scoring set that is also in an interaction set of objects, wherein a corresponding order value for an object is based on a corresponding order for the object in the high scoring set, block 110. For this example, the system aggregates the order values for each account in the top three scoring accounts that are also the sales representative's accounts, all of which are expected to be in the top three scoring accounts. FIG. 2B depicts an example of sorted scored objects in which the highest scoring object has an order value of 3, the second highest scoring object has an order value of 2, and the third highest scoring object has an order value of 1. Although FIG. 2B depicts decreasing integers as order values, the system may use any type of decreasing numbers as order values, such as the fractions 1/1, ½, ⅓, etc. By way of example and without limitation, this can include the system aggregating the order value of 3 with the order value of 1 to result in an actual aggregated order value of 4 because the highest scoring account B and the third highest scoring account D are the sales representative's accounts, but does not aggregate the order value of 2 because the second highest scoring account Z was randomly selected from the universe of all accounts and is not one of the sales representative's accounts.

After aggregating order values for high scoring objects that are in the user's set of objects, the system evaluates the personalized recommendation model for the user by dividing the aggregated order value by an aggregation of a corresponding order value for each object in the high scoring set, block 112. FIG. 2B depicts an example of sorted scored objects in which the highest scoring object has the order value of 3, the second highest scoring object has the order value of 2, and the third highest scoring object has the order value of 1, which the system can aggregate to produce a potential maximum aggregated order value of 6. In embodiments, this can include the system dividing the actual aggregated order value of 4 by the potential maximum aggregated order value of 6 to result in an evaluation of the model as the fraction 4/6, or 0.67 in decimal form. For this example, the highest evaluation would have produced the fraction 6/6, or 1.0 in decimal form. As the randomly sampled objects from the universe of objects creep into the high scoring set of objects, the normalized discounted cumulative gain metric decreases. The normalized discounted cumulative gain metric thus measures to what extent randomly sampled objects selected from the universe of objects diffuse into the high scoring set of objects.

FIG. 2C also depicts an example of sorted scored objects in which the highest scoring object has the order value of 3, the second highest scoring object has the order value of 2, and the third highest scoring object has the order value of 1, which the system can aggregate to produce a potential maximum aggregated order value of 6. In an example based on the objects depicted in FIG. 2C, in block 110 the system first aggregates the order value of 3 with the order value of 2 to result in an actual aggregated order value of 5 because the highest scoring account B and the second highest scoring account D are the sales representative's accounts, but does not aggregate the order value of 1 because the third highest scoring account Z was randomly selected from the universe of all accounts and is not one of the sales representative's accounts. Then in block 112 the system divides the actual aggregated order value of 5 by the potential maximum aggregated order value of 6 to result in an evaluation of the model as the fraction ⅚, or 0.83 in decimal form. which is a higher evaluation than the evaluation of the model as the fraction 4/6, or 0.67 in decimal from, for the sorted set of objects depicted in FIG. 2B.

FIG. 2D also depicts an example of sorted scored objects in which the highest scoring object has the order value of 3, the second highest scoring object has the order value of 2, and the third highest scoring object has the order value of 1, which the system can aggregate to produce a potential maximum aggregated order value of 6. FIG. 2D indicates that the method 100, as previously described for blocks 110 and 112, is not sensitive to the interaction strengths in the test set of objects, which are depicted as interaction values in the interactions columns of FIGS. 2A, 2D, and 2E. In the example depicted in FIG. 2D, swapping the order of account B and account D as the two highest scoring objects would not affect the actual aggregated order value, such that the evaluation would likewise unaffected. However, a model that swapped the order of account B and account D as the two highest scoring objects may be an improved model because account D has almost the same properties as account B, with the exception of a higher interaction value, which indicates that account D should be scored higher than account B. Therefore, an optional version of method 100 increases the actual aggregated order value and the corresponding evaluation when the order of account B and account D is swapped. In particular, by replacing relevance=1 in the relevance-adjusted order value by a relevance proportional to the interaction strength. The optional version of method 100 favors test objects with higher interaction values that have higher scores and favors test objects with lower interaction values that have lower scores, thereby leveraging interaction values.

In an optional version of block 110, aggregating the corresponding order value for each object in the high scoring set that is also in the interaction set of objects includes weighting an order value for an object by an interaction value that corresponds to an interaction of the user with the object. Therefore, rather than simply aggregating account B's order value of 3 and account D's order value of 2 depicted in FIG. 2D to produce the actual aggregated order value of 5, the system uses an object's interaction value to weigh the object's order value when aggregating the objects' order values. In this example, the system multiplies account B's order value of 3 by account B's interaction value of 5 to produce account B's weighted order value of 15. Similarly, the system multiplies account D's order value of 2 by account D's interaction value of 6 to produce account D's weighted order value of 12. Since account B's weighted order value of 15 and account D's weighted order value of 12 are the only non-zero weighted order values for the accounts depicted in FIG. 2D, the system aggregates account B's weighted order value of 15 and account D's weighted order value of 12 to produce an actual aggregated order value of 27.

In an optional version of block 112, the aggregation of the corresponding order value for each object in the high scoring set is based on resorting each scored object based on a decreasing order of a corresponding interaction value, and weighting an order value for each object by a corresponding interaction value. Therefore, rather than simply aggregating the order value of 3 and the order value of 2 and the order value of 1 depicted in FIG. 2D to produce the aggregated order value of 6 for every object in the high scoring set, the system first resorts the objects based on their corresponding interaction values to produce an optimal sorted set based on interaction values. Then the system uses an object's interaction value to weigh the object's order value in the optimal sorted set based on interaction values when aggregating the objects' order values. In this example, the system resorts the objects by interaction values, thereby resulting in an order in which account D is first in the optimal sorted set based on account D's interaction value of 6, account B is second in the optimal sorted set based on account B's interaction value of 5, and account F is third in the optimal sorted set based on account F's interaction value of 4. Then the system multiplies account D's order value of 3 by account D's interaction value of 6 to produce account D's weighted order value of 18. Similarly, the system multiplies account B's order value of 2 by account B's interaction value of 5 to produce account B's weighted order value of 10. Likewise, the system multiplies account F's order value of 1 by account F's interaction value of 4 to produce account F's weighted order value of 4. Since account D's weighted order value of 18, account B's weighted order value of 10, and account F's weighted order value of 4 are the only non-zero weighted order values for the accounts in the optimal sorted set based on interaction values, the system aggregates account D's weighted order value of 18, account B's weighted order value of 10, and account F's weighted order value of 4 to produce an maximum aggregated weighted order value of 32. Then the system divides the actual aggregated weighted order value of 27 by the maximum aggregated weighted order value of 32 to result in an evaluation of the model as the fraction $27/32$, or 0.84 in decimal form.

In an example based on the objects depicted in FIG. 2E, in the optional version of block 110 the system multiplies account D's order value of 3 by account D's interaction value of 6 to produce account D's weighted order value of 18. Similarly, the system multiplies account B's order value of 2 by account B's interaction value of 5 to produce account B's weighted order value of 10. Since account D's weighted order value of 18 and account B's weighted order value of 10 are the only non-zero weighted order values for the accounts depicted in FIG. 2E, the system aggregates account D's weighted order value of 18 and account B's weighted order value of 10 to produce an actual aggregated order value of 28. Since FIG. 2E depicts the same set of objects as FIG. 2D, the maximum aggregated weighted order value of 32 for the resorted set of objects remains the same for the optional version of block 112 when applied to FIG. 2E. Therefore, the system divides the actual aggregated weighted order value of 28 by the maximum aggregated $28/32$, or 0.88 in decimal form, which is a higher evaluation than the evaluation of the model as the fraction $27/32$, or 0.84 in decimal from, for the sorted set of objects depicted in FIG. 2D.

Having evaluated the model for a single user, the system optionally evaluates the personalized recommendation model for each of multiple users, including the user, block 114. For example and without limitation, this can include the system repeating the process described in blocks 102-112 to evaluate all personalized recommendation models for all sales representatives.

Having evaluated the models for multiple users, the system optionally comprehensively evaluates the recommendation model upon which the personalized recommendation models is based by averaging the evaluation of the personalized recommendation model for each of the multiple users, block 116. By way of example and without limitation, this can include the system averaging all of the evaluations of all personalized recommendation models to produce a comprehensive evaluation of the recommendation model upon which all of the personalized recommendation models are based.

The method 100 may be repeated as desired. Although this disclosure describes the blocks 102-116 executing in a particular order, the blocks 102-116 may be executed in a different order. In other implementations, each of the blocks 102-116 may also be executed in combination with other blocks and/or some blocks may be divided into a different set of blocks.

FIGS. 2A-2E illustrate example objects for evaluating personalized recommendation models, under an embodiment. As described above, FIG. 2A depicts a sales representative's six accounts {A, B, C, D, E, F} and a random sampling of three accounts {X, Y, Z} from the universe of accounts which a personalized recommendation model may score.

As described above, FIG. 2B depicts the top three scoring accounts {B, Z, D} in a scored ordered set, which corresponds to the scores {68, 67, 66} and the order values {3, 2, 1}, respectively. In an example described above, the system uses the objects, recommendation scores, and order values in the ordered set of objects depicted in FIG. 2B to calculate an evaluation of the model as the fraction $4/6$, or 0.67 in decimal form.

As described above, FIG. 2C depicts the top three scoring accounts {B, D, Z} in a scored ordered set, which corresponds to the scores {84, 83, 67} and the order values {3, 2, 1}, respectively. In an example described above, the system uses the objects, recommendation scores, and order values in the ordered set of objects depicted in FIG. 2C to calculate an evaluation of the model as the fraction $5/6$, or 0.83 in decimal form.

As described above, FIG. 2D depicts the top three scoring accounts {B, D, Z} in a scored ordered set, which corresponds to the scores {84, 83, 67} the order values {3, 2, 1}, the interaction values {5, 6, 0}, and the weighted order values {15, 12, 0}, respectively. In an example described above, the system uses the objects, recommendation scores, order values, interaction values, and weighted order values in the ordered set of objects depicted in FIG. 2D to calculate an evaluation of the model as the fraction $27/32$, or 0.84 in decimal form.

As described above, FIG. 2E depicts the top three scoring accounts {D, B, Z} in a scored ordered set, which corresponds to the scores {84, 83, 67} the order values {3, 2, 1}, the interaction values {6, 5, 0}, and the weighted order values {18, 10, 0}, respectively. In an example described above, the system uses the objects, recommendation scores, order values, interaction values, and weighted order values in the ordered set of objects depicted in FIG. 2E to calculate an evaluation of the model as the fraction 28/32, or 0.88 in decimal form.

System Overview

Figure 3:
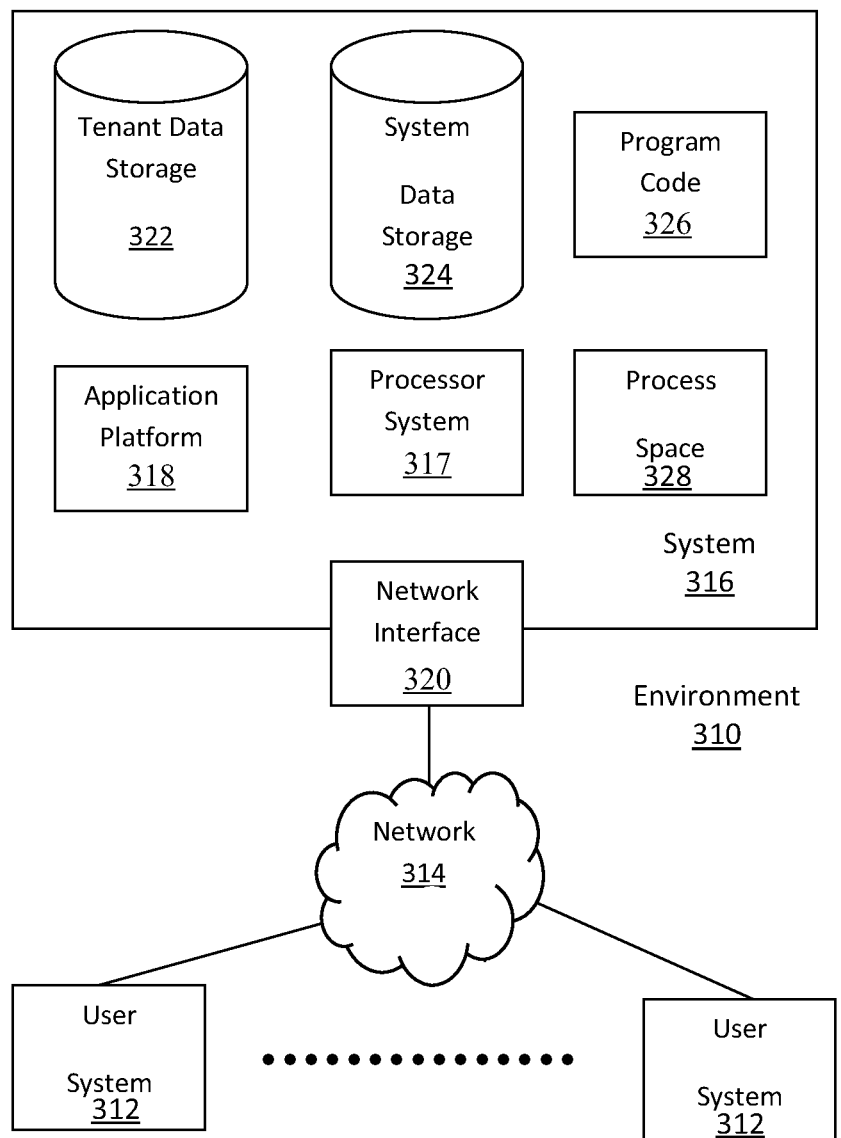
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
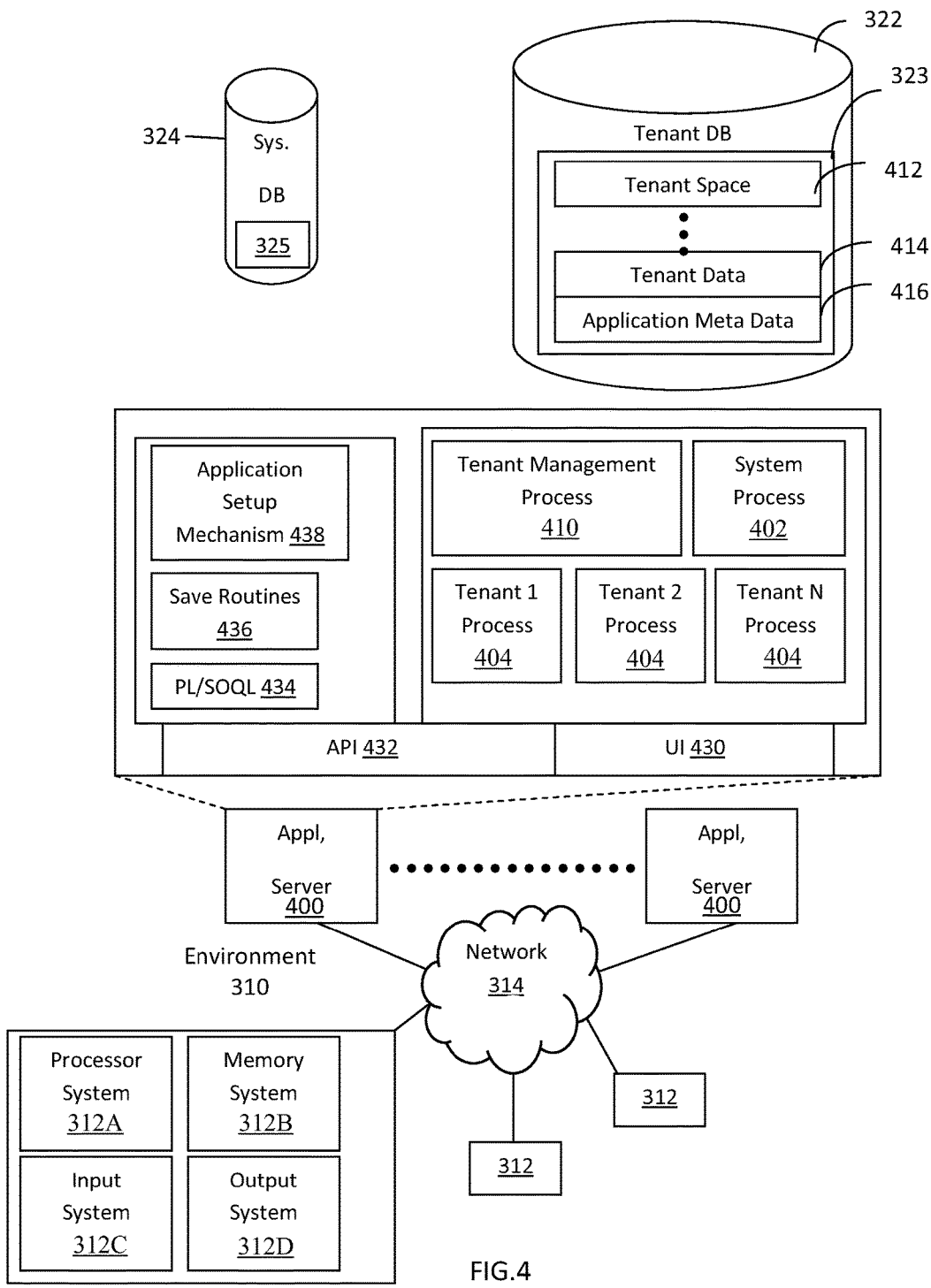
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 400₁-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 4001 might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for evaluating personalized recommendation models, the system comprising:
   one or more processors; and
   a non-transitory computer readable medium storing a plurality of instructions, which when executed, cause the one or more processors to:
      generate, using a personalized recommendation model, an object score for each object in a test set of objects, the test set of objects includes an interaction set of objects with which a user interacted and a random set of objects with which the user lacks a known interaction, the test set of objects configured for sorting the interaction set of objects with the random set of objects;
      sort each scored object based on a decreasing order of each corresponding object score;
      identify a high scoring set of the sorted objects with a number of highest corresponding object scores, wherein the number equals a total number of objects in the interaction set of objects;
      aggregate a corresponding order value for each object in the high scoring set that is also in the interaction set of objects, wherein the corresponding order value for an object is based on a corresponding order for the object in the high scoring set; and
      evaluate the personalized recommendation model for the user by dividing the aggregated order value by an aggregation of a corresponding order value for each object in the high scoring set.

2. The system of claim 1, comprising further instructions, which when executed, cause the one or more processors to train the personalized recommendation model on a training set of objects, wherein the training set of objects comprise objects with which the user interacted, and excludes objects in the interaction set of objects.

3. The system of claim 1, wherein the random set of objects with which the user lacks the known interaction comprises objects randomly selected from a plurality of objects which are available for and capable of scoring by the personalized recommendation engine.

4. The system of claim 1, wherein aggregating the corresponding order value for each object in the high scoring set that is also in the interaction set of objects comprises weighting an order value for an object by an interaction value that corresponds to an interaction of the user with the object.

5. The system of claim 4, wherein the aggregation of the corresponding order value for each object in the high scoring set is based on resorting each scored object based on a decreasing order of a corresponding interaction value and weighting an order value for each object by a corresponding interaction value.

6. The system of claim 1, comprising further instructions, which when executed, cause the one or more processors to evaluate the personalized recommendation model for each of a plurality of users, which comprise the user.

7. The system of claim 6, comprising further instructions, which when executed, cause the one or more processors to comprehensively evaluate a recommendation model upon which the personalized recommendation model is based by averaging the evaluation of the personalized recommendation model for each of the plurality of users.

8. A computer program product comprising computer-readable program code to be executed by one or more processors when retrieved from a non-transitory computer-readable medium, the program code including instructions to:
   generate, using a personalized recommendation model, an object score for each object in a test set of objects, the test set of objects includes_an interaction set objects with which a user interacted and a random set of objects with which the user lacks a known interaction, the test set of objects configured for sorting the interaction set of objects with the random set of objects;
   sort each scored object based on a decreasing order of each corresponding object score;
   identify a high scoring set of the sorted objects with a number of highest corresponding object scores, wherein the number equals a total number of objects in the interaction set of objects;
   aggregate a corresponding order value for each object in the high scoring set that is also in the interaction set of objects, wherein the corresponding order value for an object is based on a corresponding order for the object in the high scoring set; and
   evaluate the personalized recommendation model for the user by dividing the aggregated order value by an aggregation of a corresponding order value for each object in the high scoring set.

9. The computer program product of claim 8, wherein the program code comprises further instructions to train the personalized recommendation model on a training set of objects, wherein the training set of objects comprise objects with which the user interacted, and excludes objects in the interaction set of objects.

10. The computer program product of claim 8, wherein the random set of objects with which the user lacks the known interaction comprise objects randomly selected from a plurality of objects which are available for and capable of scoring by the personalized recommendation engine.

11. The computer program product of claim 8, wherein aggregating the corresponding order value for each object in the high scoring set that is also in the interaction set of objects comprises weighting an order value for an object by an interaction value that corresponds to an interaction of the user with the object.

12. The computer program product of claim 11, wherein the aggregation of the corresponding order value for each object in the high scoring set is based on resorting each scored object based on a decreasing order of a corresponding interaction value and weighting an order value for each object by a corresponding interaction value.

13. The computer program product of claim 8, wherein the program code comprises further instructions to evaluate the personalized recommendation model for each of a plurality of users, which comprise the user.

14. The computer program product of claim 13, wherein the program code comprises further instructions to comprehensively evaluate a recommendation model upon which the personalized recommendation model is based by averaging the evaluation of the personalized recommendation model for each of the plurality of users.

15. A method for evaluating personalized recommendation models, the method comprising:
generating, using a personalized recommendation model, an object score for each object in a test set of objects, the test set of objects includes an interaction set of objects with which a user interacted and a random set of objects with which the user lacks a known interaction, the test set of objects configured for sorting the interaction set of objects with the random set of objects;
sorting each scored object based on a decreasing order of each corresponding object score;
identifying a high scoring set of the sorted objects with a number of highest corresponding object scores, wherein the number equals a total number of objects in the interaction set of objects;
aggregating a corresponding order value for each object in the high scoring set that is also in the interaction set of objects, wherein the corresponding order value for an object is based on a corresponding order for the object in the high scoring set; and
evaluating the personalized recommendation model for the user by dividing the aggregated order value by an aggregation of a corresponding order value for each object in the high scoring set.

16. The method of claim 15, wherein the method further comprises training the personalized recommendation model on a training set of objects, wherein the training set of objects comprise objects with which the user interacted, and excludes objects in the interaction set of objects.

17. The method of claim 15, wherein the random set of objects with which the user lacks the known interaction comprise objects randomly selected from a plurality of objects which are available for and capable of scoring by the personalized recommendation engine.

18. The method of claim 15, wherein aggregating the corresponding order value for each object in the high scoring set that is also in the interaction set of objects comprises weighting an order value for an object by an interaction value that corresponds to an interaction of the user with the object.

19. The method of claim 18, wherein the aggregation of the corresponding order value for each object in the high scoring set is based on resorting each scored object based on a decreasing order of a corresponding interaction value and weighting an order value for each object by a corresponding interaction value.

20. The method of claim 15, wherein the method further comprises:
evaluating the personalized recommendation model for each of a plurality of users, which comprise the user; and
comprehensively evaluating a recommendation model upon which the personalized recommendation model is based by averaging the evaluation of the personalized recommendation model for each of the plurality of users.

* * * * *